UNITED STATES PATENT OFFICE.

CHARLES S. EPPLEY, OF YORK, PENNSYLVANIA, ASSIGNOR TO NEW IDEAL POWER COMPANY.

CHEMICAL COMPOSITION.

1,417,047.     Specification of Letters Patent.     Patented May 23, 1922.

No Drawing.     Application filed September 30, 1920. Serial No. 413,910.

*To all whom it may concern:*

Be it known that I, CHARLES S. EPPLEY, a citizen of the United States, residing at York, in the county of York, State of Pennsylvania, have invented a new and useful Chemical Composition; and I do hereby declare the following to be a full, clear, and exact description of the invention, such as will enable others skilled in the art to which it appertains to make and use the same.

The invention relates to chemical compositions and has for its object to provide a chemical composition of the character particularly for use in driving machinery, through which machinery the expanded vapors pass, reciprocate pistons and is exhausted from the machinery, then reduced to a liquid form through compression of low temperature and returned to its original source, said chemical composition comprising a mixture of anhydrous ammonia, carbon dioxide to which is added lubricating oil for lubricating the parts of the machinery if so desired.

It has been found that by mixing anhydrous ammonia with a lubricant of the character described, or mixing carbon dioxide with a lubricant that a cheap chemical composition can be made and one wherein the maximum efficiency is obtained for driving machinery. The composition being in a liquid form may be vaporized by subjecting the same to heat or by passing the same through a carbureter, however it is preferably vaporized through raising its temperature by subjecting the tank in which it is disposed to heat. When the chemical after being vaporized and the vapors after having passed through the machinery and the expansive qualities of the vapors utilized for driving the machinery, vapors are exhausted and are again reduced to a liquid form. The reduction of the vapors to a liquid form being preferably accomplished by subjecting the vapors to a low temperature, however, it is to be understood that if so desired they may be reduced to a liquid form by any method desired, for instance by compression.

It has been found that the lubricating oil when mixed either with carbon dioxide or with anhydrous ammonia, that the lubricating oil will thoroughly break up and vaporize and the particles of oil will be carried through the machinery and deposited on the various parts which are exposed to the action of the chemicals, thereby preventing corrosion.

The invention having been set forth what is claimed as new and useful is:—

1. A chemical composition which expands under heat comprising a mixture of anhydrous ammonia and carbon dioxide.

2. A chemical composition which expands under heat comprising a mixture of anhydrous ammonia, carbon dioxide and lubricating oil.

In testimony whereof I have signed my name to this specification in the presence of two subscribing witnesses.

CHARLES S. EPPLEY.

Witnesses:
    FAY WORKINGER,
    M. J. RAFFENSBERGER.